UNITED STATES PATENT OFFICE.

CHARLES E. RAMUS, OF LAWRENCE, KANSAS.

IMPROVEMENT IN TREATING PINE LEAVES FOR USE IN THE ARTS.

Specification forming part of Letters Patent No. 136,671, dated March 11, 1873.

*To all whom it may concern:*

Be it known that I, CHARLES E. RAMUS, of Lawrence, in the county of Douglas and the State of Kansas, have invented or discovered a new and useful Improvement in Treating Pine Leaves and other similar substances to render them useful in the Arts, of which the following is a specification;

My invention consists, broadly, in treating pine leaves, such as are generally known as pine tacks, pine straw, pine needles, or pine tops, and other similar leafy and fibrous substances, to render them useful as articles of manufacture and trade in the arts.

The method by which this new production is accomplished consists in treating such substances with chemical ingredients of either lime, soda, or potash, or their equivalents, to be used either separately or as a compound, according to the purpose for which such articles of commerce are intended to be used or employed, or the condition or quality of such article desired. The process of such treatment is by submitting the things to the action of boiling, or by cooking them, either by fire or the direct application of steam, within any kind of vessel suitable for the purpose.

The duration of such treatment is determined according to the quality and character of the article desired to be produced, as according to the degree of boiling or cooking depends the quality of the article.

After a proper boiling operation, the solution, which becomes a strong lye, is drawn off from the vessel, and clear water then introduced for washing the material, so as to clean it and partially divest it of the lye, acids, and mattery pulp which remain from the first operation. The said washing process having been performed, and the vessel or tank emptied of the washing-water, the vessel is again filled with pure water, and a second boiling or cooking operation made, as at first, for the purpose of effectually extracting the acids and chemical residuum which may be retained in the thread-like or fiber mass from the first operation, and which it is important to separate from the article.

If deemed necessary, other washings of the substance may be made, after which the fibrous substance is then removed from the vessel, and subjected to the operation of roping or cording in order to reduce it to a more or less fibrous condition, when it is removed from the vessel, and dried by any suitable means and way, either using cold or hot air for the purpose. It then is ready for the market as a new and useful article of commerce, and may be put in bales or in any convenient form for sale.

The uses to which my invention may be applied are numerous; such, for instance, as upholstering in all its branches, being intended as a substitute for hair, feathers, moss, cotton, tow, wool, sponge, wood-rivings, packing, and underlining, and, in fact, all articles which are used for the purposes for which the above-named things are utilized.

One of the distinguishing features of my invention lies in the fact that it is an effectual and instant repellent to moths, bed-bugs, fleas, and other vermin.

In this new article, so produced, it will wear without losing its elasticity, because its original condition is elastic, and each and every one of its fibers may be likened unto so many fine springs. Not so with any other material for the purpose with which I am acquainted, as its elasticity is rendered artificial in the operation of its manufacture to a greater or less extent.

I have described a particular process and ingredients to be used in the same; but it is obvious that my invention is the result of a broader conception, not dependent upon any particular way or chemicals for carrying it into effect so long as the fiber of the leaf is separated from the matter which cannot be used for the purpose.

Having described my invention, I claim—

1. The process herein described, or its equivalent, for treating pine leaves and other similar articles to render them fit for use in the arts.

2. Pine leaves and other similar articles treated by the chemical ingredients herein described, or their equivalent, for the purpose described.

3. The new material herein described.

In testimony whereof I have hereunto set my hand in the presence of two subscribing witnesses this 5th day of March, A. D. 1873.

CHARLES E. RAMUS.

Witnesses:
A. E. H. JOHNSON,
J. W. HAMILTON JOHNSON.